United States Patent [19]

Hughes

[11] 3,991,383

[45] Nov. 9, 1976

[54] FRANZ-KELDYSH EFFECT TUNED LASER

[75] Inventor: Richard Swart Hughes, China Lake, Calif.

[73] Assignee: The United States of America as represented by the Secretary of the Navy, Washington, D.C.

[22] Filed: Mar. 28, 1975

[21] Appl. No.: 563,264

[52] U.S. Cl. ..................... 331/94.5 M; 350/160 R
[51] Int. Cl.² .......................................... H01S 3/10
[58] Field of Search .................... 350/160; 331/94.5

[56] References Cited
UNITED STATES PATENTS

| | | |
|---|---|---|
| 3,854,795 | 12/1974 | Honda ............................. 350/160 R |
| 3,872,407 | 3/1975 | Hughes .......................... 331/94.5 C |
| 3,894,792 | 7/1975 | Komatsubara et al. ......... 350/160 R |
| 3,902,137 | 8/1975 | Hughes .......................... 331/94.5 C |

*Primary Examiner*—William L. Sikes
*Attorney, Agent, or Firm*—R. S. Sciascia; Roy Miller

[57] ABSTRACT

A tunable laser having a laser material capable of being tuned such as an organic dye, tuning means including an intra-cavity semiconductor element to which an electric field can be applied, and an angle sensitive filter or reflector such as a diffraction grating.

4 Claims, 3 Drawing Figures

FRANZ-KELDYSH EFFECT TUNED LASER

BACKGROUND OF THE INVENTION

The broad band laser emission observed from organic dye lasers provides a source of continuously tunable coherent radiation. Tuning of a dye laser was first accomplished in 1967 by Soffer and McFarland by replacing the back reflector of the optical resonant cavity with a rotatable diffraction grating. Since that time other organic dye laser tuning techniques for producing narrowband laser emission have been devised, most of which have been electro-mechanical in design.

The primary disadvantage in using any tuning system that has moving parts, such as a rotatable diffraction grating or electro-mechanical devices, is its limited tuning rate. The present invention is a tuning system having no moving parts. That is, tuning is accomplished by employing stationary components, which are a semiconductor subjected to a strong electric field and a diffraction grating. Intracavity laser beam deflection is responsive to the electric field applied to the semiconductor, and the wavelength retroreflected by the grating is dependent upon the angle of incidence of the deflected intracavity beam on the grating. Thus, the magnitude of the applied field determines the wavelength reflected back into the system, which, in turn, determines the laser wavelength.

DESCRIPTION OF THE PREFERRED EMBODIMENT

Figure 1:
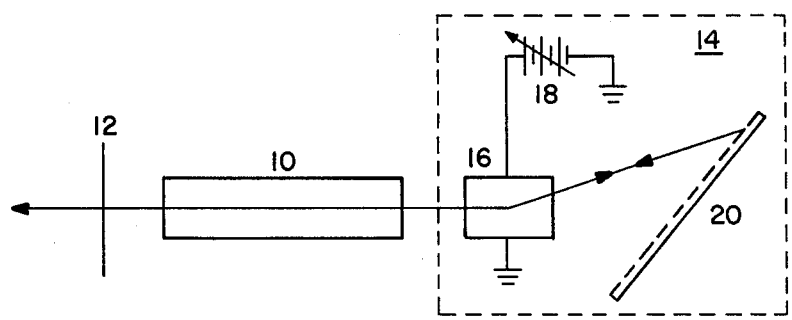
FIG. 1 is a plan view of a preferred embodiment of the present invention.

A preferred embodiment of the present invention is shown in FIG. 1. Included are laser material 10 capable of being tuned, system output mirror 12 that is partially reflective, and laser tuning system 14. System 14 comprises semiconductor 16 subjected to a high electric field applied by voltage source 18, and angle sensitive filter or reflector 20. Laser material 10 may be an organic dye or injection laser, or any other laser material that is capable of being tuned either continuously or step-wise. If the laser is a typical line source, such as that generated by a ruby laser, the technique herein described can be effectively used as a Q-switch, as will be discussed later. The material's wavelength band over which it can be tuned must coincide with that portion of the spectrum that is near the fundamental absorption edge of semiconductor 16. That is, its absorption edge when no electric field is applied. Output mirror 12 may be conventional, and must be selected by experimentation to provide sufficient oscillatory feedback to sustain oscillation in the cavity and at the same time provide sufficient output intensity for its intended application.

It is well known in the art that a light beam traversing a dielectric medium with changing refractive index will be deflected. This effect is most pronounced if the light beam passes perpendicular to the direction of highest refractive index gradient. It is also known that changes in the placement in the absorption edge of a semiconductor relative to the fundamental absorption edge is induced by strong electric fields, and that application of the field resulting in a shift of the absorption edge will also cause changes in the refractive index of the semiconductor. Therefore the electric field is applied across crystal 16 orthogonal to beam direction so that the beam passes perpendicular to the direction of highest refractive index gradient.

Figure 2:
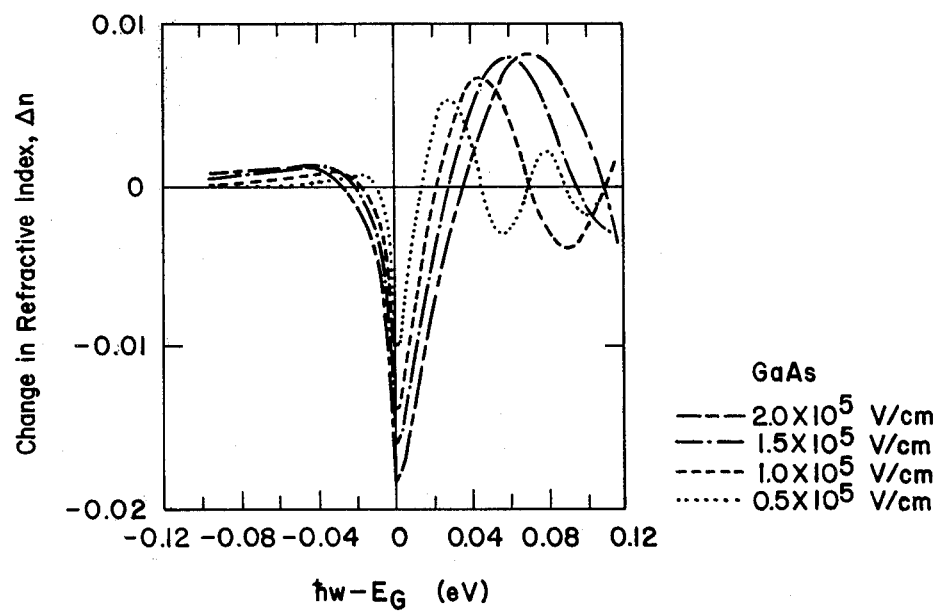
FIG. 2 is a graph showing the change in refractive index of GaAs over a range of laser energies ($h\omega$-$E_G$) for various applied fields.
Figure 3:
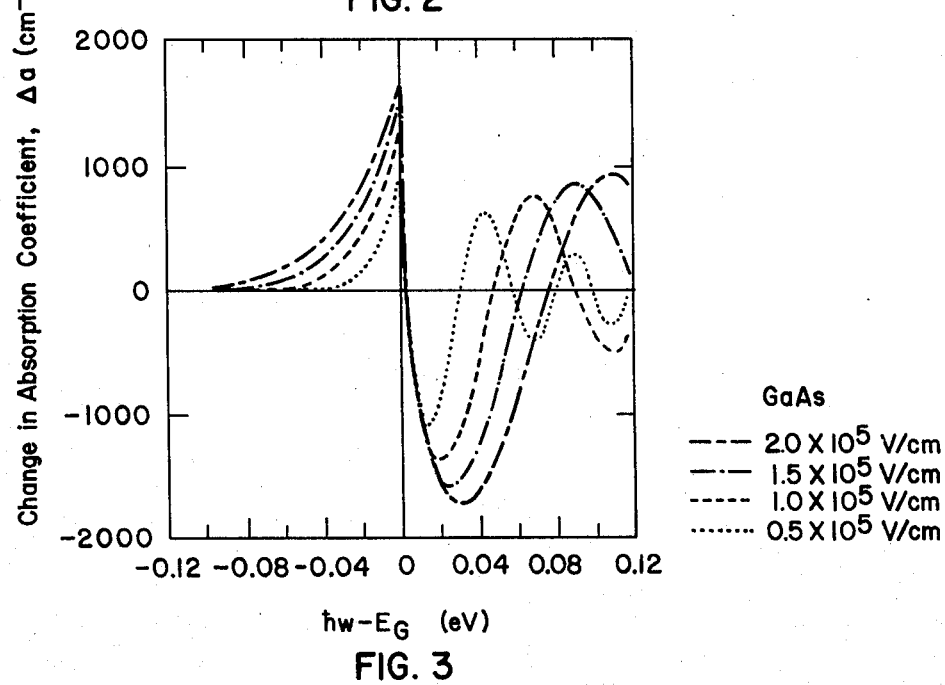
FIG. 3 is a graph showing the change in absorption coefficient of GaAs over a range of laser energies for various applied fields.

The change in placement, or shift to longer wavelengths, of the absorption edge upon the application of an electric field is the well known Franz-Keldysh effect. FIG. 2 shows the change in refractive index of the semiconductor GaAs induced by electric fields of various strengths relative to changing laser energy level. Note that the change in refractive index is maximum at or near the absorption edge $E_G$ (0). The present invention utilizes this phenomenon to achieve sufficient deflection at change in absorption coefficient of GaAs for various applied fields relative to changing laser energy. Note that laser energies greater than $E_G$ (0) are substantially absorbed by the semiconductor. That is, energies to the right in FIG. 3 are absorbed heavily by the semiconductor, especially at levels just above the absorption edge.

As a result, if the beam is to pass without being absorbed, the laser band must be in energies less than the absorption edge, or the semiconductor sample employed must be very thin. The approach is to select a semiconductor having an absorption edge just above the energy band of the laser chosen. Thereby, beam refraction can be achieved by applying the electric field without causing beam absorption. By varying the field, the degree of deflection can be varied slightly. Thereby, the crystal with varying field applied is a beam scanner which scans the intra-cavity beam across the fixed angle sensitive filter or reflector 20.

Laser tuning is achieved as follows: Laser material 10 is chosen which can lase at wavelengths at and/or about the fundamental absorption edge of semiconductor scanner 16. Scanning action is caused by the change in refractive index which accompanies the shift in the absorption edge of the semiconductor material induced by the electric field generated by voltage source 18. By varying source 18 the electric field induced is varied and causes the intra-cavity laser beam to be scanned at continuously varying angles across retroreflective member 20. The retroreflective member can be a diffraction grating operated in the retroreflection configuration. Since the wavelength at which laser action can occur depends upon the angle of incidence that the intra-cavity beam makes with fixed reflective member 20, the output wavelength of the laser is dependent on the degree of induced deflection which, in turn, is dependent on the electric field applied. Varying the field varies the output wavelength.

The laser can be tuned extremely rapidly using the above described approach. And, tuning is accomplished with no moving components. Tuning rates of 100 MHz should be realizable. From computations developed by others a deflection angle in the order of 10° can be obtained by a crystal having a thickness of approximately 0.5mm. This is sufficient to scan almost all known organic dye laser bands.

To those skilled in the art it will be obvious upon a study of this disclosure that the present invention permits a variety of modifications in structure and arrangement and hence can be given embodiments other than particularly illustrated and described herein, without departing from the essential features of the invention within the scope of the claims annexed hereto.

What is claimed is:
1. An electro-optical laser tuning system comprising:
   a laser cavity including a lasing cell, bounded at one end by a laser output mirror;
   fixed reflecting means at the opposite end of said cavity, optically separated from said output mirror by at least said lasing cell, for retroreflecting those wavelengths that are incident thereon at their retroreflective angle, wherein each wavelength has a retroreflective angle unique thereto; and
   diffracting means in said cavity and adjacent said reflecting means for electro-optically diffracting the laser beam in response to an electrical field such that the angle of incidence of said beam on said reflecting means is determined by said field, including semiconductor structure in the path of said beam supportive of the Franz-Keldysh effect, said structure being coupled to a source of electrical energy which generates said field, said field within said structure being causative of said effect such that the retractive index of said structure is responsive to said field which is, in turn, responsive to the electrical energy applied; wherein said system is continuously tunable.
2. The system of claim 1 wherein said field is orthogonal to said beam path.
3. The system of claim 2 wherein said structure is Gallium Arsenide.
4. The system of claim 3 wherein said reflecting means is a fixed diffraction grating.

* * * * *